(12) United States Patent
Golowner et al.

(10) Patent No.: US 8,069,367 B2
(45) Date of Patent: Nov. 29, 2011

(54) VIRTUAL LOCK STEPPING IN A VITAL PROCESSING ENVIRONMENT FOR SAFETY ASSURANCE

(75) Inventors: Jeffrey H. Golowner, Great Neck, NY (US); Gerhard F. Meyer, Oceanside, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 221 days.

(21) Appl. No.: 12/435,516

(22) Filed: May 5, 2009

(65) Prior Publication Data

US 2010/0287421 A1    Nov. 11, 2010

(51) Int. Cl.
*G06F 11/00* (2006.01)
(52) U.S. Cl. ......................................... 714/11
(58) Field of Classification Search ............... 714/11
See application file for complete search history.

(56) References Cited

U.S. PATENT DOCUMENTS

| | | | | |
|---|---|---|---|---|
| 5,088,021 A | * | 2/1992 | McLaughlin et al. | 700/82 |
| 5,157,780 A | * | 10/1992 | Stewart et al. | 714/31 |
| 5,862,502 A | | 1/1999 | Giers | |
| 6,135,396 A | * | 10/2000 | Whitfield et al. | 246/182 R |
| 6,393,582 B1 | | 5/2002 | Klecka et al. | |
| 6,622,068 B2 | * | 9/2003 | Hawthorne | 701/19 |
| 6,654,648 B2 | * | 11/2003 | Nada et al. | 700/19 |
| 6,658,595 B1 | * | 12/2003 | Thamattoor | 714/11 |
| 7,383,469 B2 | * | 6/2008 | Yang | 714/36 |
| 7,853,824 B2 | * | 12/2010 | Tai | 714/11 |
| 2003/0105561 A1 | * | 6/2003 | Nickles et al. | 701/19 |
| 2010/0049268 A1 | * | 2/2010 | Martins | 607/9 |
| 2010/0185472 A1 | * | 7/2010 | Goodermuth et al. | 705/7 |

OTHER PUBLICATIONS

Satarkar, Pradnya, "AU Application No. 201020446 Office Action Jul. 15, 2011",, Publisher: IPA, Published in: AU.

* cited by examiner

*Primary Examiner* — Christopher McCarthy
(74) *Attorney, Agent, or Firm* — DeMont & Breyer, LLC

(57) ABSTRACT

An apparatus and method for train control utilizing virtual lock stepping are disclosed. In accordance with the illustrative embodiment, an improved method of train control utilizes identical software applications executing on redundant processors. The redundant processors are maintained in virtual lock step to ensure the safety integrity of the overall system being controlled. In accordance with the illustrative embodiment, one software process is a master and one software process is a slave. The master and the slave both independently execute application logic based upon detected events (e.g., input data, etc.). In order to ensure that any anomalies that might result in a hazard are detected in the timeliest manner, and that false anomalies are minimized, the redundant software processes must process the same event within a specified time frame.

8 Claims, 2 Drawing Sheets

VIRTUAL LOCK STEPPING IN A VITAL PROCESSING ENVIRONMENT FOR SAFETY ASSURANCE

FIELD OF THE INVENTION

The present invention relates to safety-critical systems in general, and, more particularly, to virtual lock stepping.

BACKGROUND OF THE INVENTION

Typically in a safety-critical system there are one or more system components having certain measures and techniques considered so critically important they are referred to as vital. In some domains such as the rail industry and the associated positive train control systems, a safety-critical system with improved vitality is implemented to ensure that the train control system does not fail ambiguously.

Positive train control systems are utilized to prevent unsafe movement, avoid train collision or separation, enforce speed restrictions, enforce wayside safety for rail workers, and so forth. In positive train control systems it is imperative that a safety-critical system be capable of redundant cross checking of events in order to detect when a fault (e.g., individual hardware failure, network failure, data corruption, anomalies, etc.) occurs and react accordingly to the fault in a timely and vital manner.

SUMMARY OF THE INVENTION

Approaches to safety-critical systems in the prior art, such as intrinsic fail-safe design, checked redundancy, N-version programming, diversity and self checking, and numerical assurance have proven impractical in train control systems. Additionally, such techniques are not cost-effective to use and maintain due to special-purpose hardware design requirements, large-scale software requirements, and so forth, given the complexities inherent in onboard train control systems.

The present invention provides a method of train control utilizing virtual lock stepping that can mitigate some of these disadvantages. In particular, the illustrative embodiment employs a method by which identical software applications executing on electronically coupled redundant processors are maintained in virtual lock step to ensure the safety and integrity of the overall system being controlled.

In accordance with the illustrative embodiment, a first software process is a master and a second software process is a slave. The master and the slave both independently execute application logic based upon detected events (e.g., input data, time-based events, etc.). In order to ensure that any anomalies that might result in a hazard are detected in the timeliest manner, and that false anomalies are minimized, the redundant software processes must process the same event within a specified time frame.

The illustrative embodiment comprises: receiving a first signal at a first processor, wherein the first signal indicates the occurrence of an event, and wherein the first processor executes a first instance of a software application; transmitting a second signal from the first processor to a second processor, wherein the second signal indicates the occurrence of the event, and wherein the second processor executes a second instance of the software application; processing the event in the first instance of the software application; processing the event in the second instance of the software application; transmitting from the second processor to the first processor a third signal that indicates the result of the processing of the event in the second instance of the software application; transmitting from the first processor a fourth signal that indicates that the event has been processed; generating an alert that indicates a potential safety-critical fault when at least one of the following occurs: the second signal is not received at the second processor within a first time threshold of the transmission of the first signal; the third signal is not received at the first processor within a second time threshold of the transmission of the second signal; the transmission of the fourth signal is not detected within a third time threshold of the transmission of the first signal; and there is an inconsistency between the contents of the third signal and the result of the processing of the event in the first instance of the software application.

DETAILED DESCRIPTION

Figure 1:
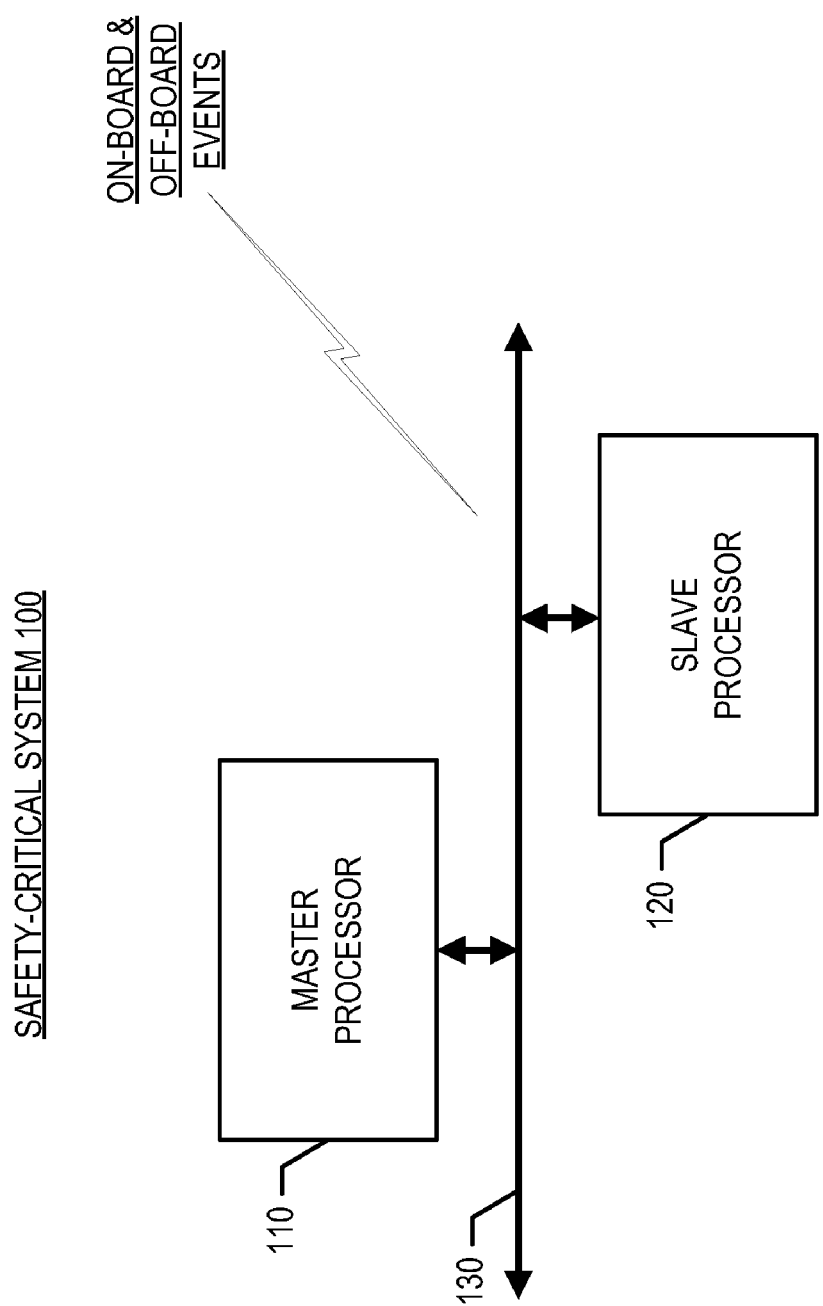
FIG. 1 depicts safety-critical system 100, in accordance with the illustrative embodiment of the present invention.

FIG. 1 depicts safety-critical system 100, in accordance with the illustrative embodiment of the present invention.

As shown in FIG. 1, safety-critical system 100 comprises master processor 110, slave processor 120, and communications channel 130, interconnected as shown.

Master processor 110 is a general-purpose processor that is capable of receiving on-board and off-board events via communications channel 130, of receiving and transmitting information from and to slave processor 120, and of performing the relevant tasks described below and with respect to FIG. 2, in well-known fashion.

Slave processor 120 is a general-purpose processor that is capable of receiving on-board and off-board events via communications channel 130, of receiving and transmitting information from and to master processor 110, and of performing the relevant tasks described below and with respect to FIG. 2, in well-known fashion.

Communications channel 130 communications between master processor 110 and slave processor 120 in well-known fashion. As will be appreciated by the art, in some embodiments of the present invention communications channel 130 might be a network link, while in some other embodiments of the present invention communications channel 130 might be a system bus or some other type of data conduit. In any case, it will be clear to those skilled in the art, after reading this disclosure, how to make and use communication channel 130.

Master processor 110 is configured to receive all external events (i.e., message-based inputs from external, off-board systems such as authorities, bulletins, other train control data, and so forth) and other on-board systems (e.g., precise location, wheel tach data, control settings, brake system pressures, etc.).

Master processor 110 is configured to forward these off-board and on-board events in the form of Cyclic Redundancy Check (CRC) encoded messages to slave processor 120. Master processor 110 ensures that slave processor 120 has accepted each event and then continues to process each event.

Master processor 110 and slave processor 120 are configured to exchange, at the conclusion of processing an event, Cyclic Redundancy Check (CRC) encoded vital signature data (e.g., target profiles, enforcement decisions, operating states, time, etc.) for comparison to ensure results of the processed event are consistent.

Configurable time limitations are applied to ensure the distribution of events and exchange of vital information occurs in a timely fashion. If any time limitation is exceeded, or any comparison of vital information fails, master processor 110 and/or slave processor 120, independently raises a safety critical fault and takes an appropriate response action (e.g., an interaction, or lack thereof, with the vital enforcement system, etc.) to bring the system to a safe state.

The context of virtual lock stepping creates an execution paradigm that utilizes identical application software executing on multiple commercially-available general-purpose processors and operating systems, with a redundant cross-checking capability that recognizes and reacts to individual hardware failures, inter-processor communication failures, data corruption, and so forth. The result is a vital processing environment well-suited for safety-critical applications.

As will be appreciated by those skilled in the art, in some embodiments of the present invention master processor 110 and slave processor 120 might belong to the same data-processing system (e.g., processors in a multi-processor server, processes that are executed by a single microprocessor, etc.), while in alternative embodiments, master processor 110 and slave processor 120 might belong to different data-processing systems.

As will further be appreciated by those skilled in the art, in some alternative embodiments of the present invention one or both of master processor 110 and slave processor 120 might be a special-purpose processor, rather than a general-purpose processor. In any case, it will be clear to those skilled in the art, after reading this specification, how to make and use embodiments of the present invention employing master processor 110 and slave processor 120.

As will yet further be appreciated by those skilled in the art, in some alternative embodiments of the present invention, a plurality of slave processors 120 might be employed, and it will be clear to those skilled in the art, after reading this specification, how to make and use embodiments of the present invention that employ multiple slave processors 120.

Figure 2:
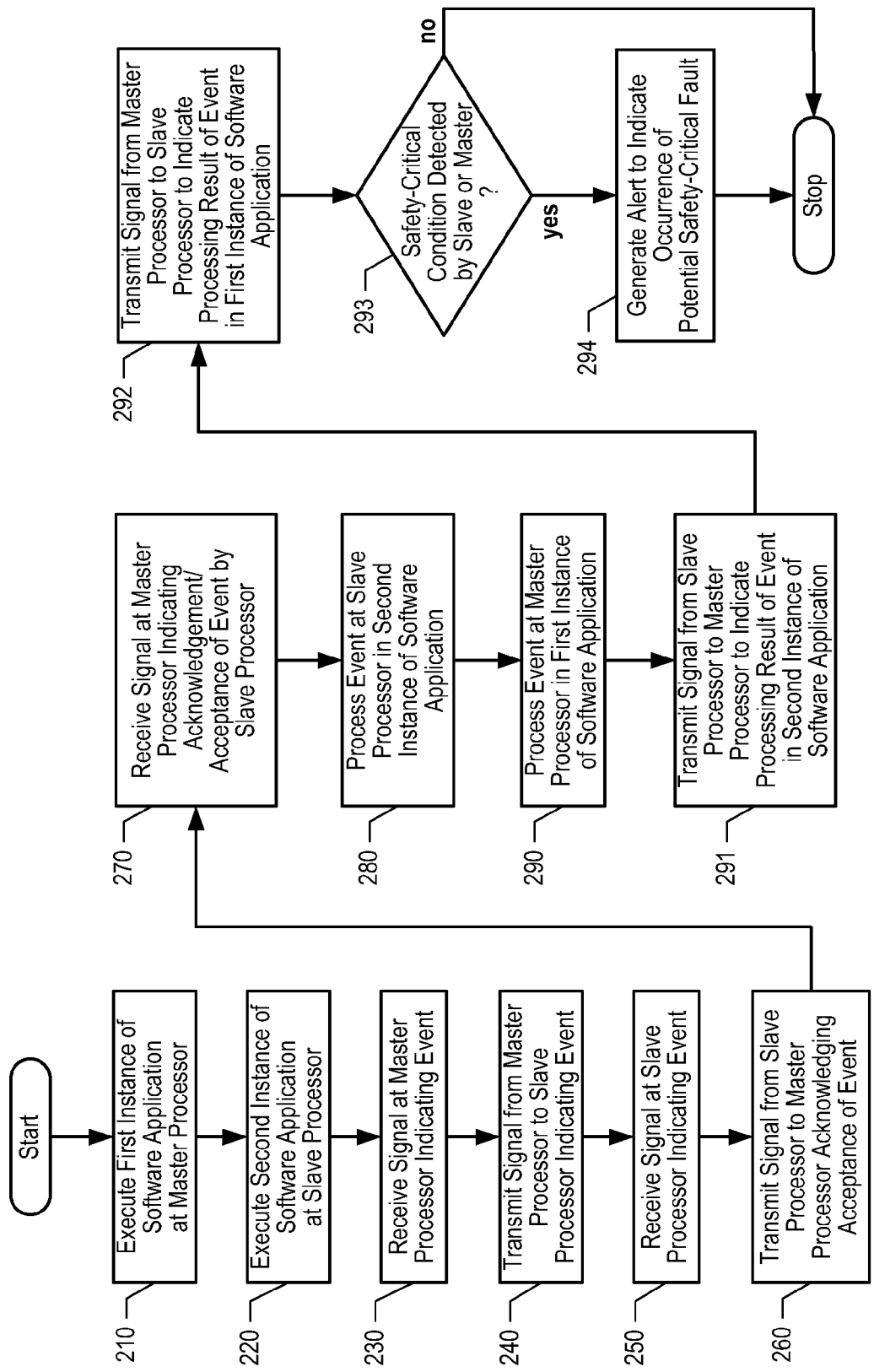
FIG. 2 depicts a flowchart of the salient tasks of safety-critical system 100, in accordance with the illustrative embodiment of the present invention.

FIG. 2 depicts a flowchart of the salient tasks of safety-critical system 100, in accordance with the illustrative embodiment of the present invention. It will be clear to those skilled in the art, after reading this disclosure, which tasks depicted in FIG. 2 can be performed simultaneously or in a different order than that depicted.

At task 210, master processor 110 executes a first instance of a software application, in well-known fashion.

At task 220, slave processor 120 executes a second instance of the software application, in well-known fashion.

At task 230, a signal is received at master processor 110, indicating the occurrence of an event.

At task 240, master processor 110 transmits a signal to slave processor 120, indicating the occurrence of the event, in well-known fashion.

At task 250, the signal transmitted at task 240 is received at slave processor 120, indicating the occurrence of the event.

At task 260, slave processor 120 transmits a signal to master processor 110, acknowledging the acceptance of the event, in well-known fashion.

At task 270, the signal transmitted at task 260 is received at master processor 110, indicating acknowledgement/acceptance of the event by slave processor 120, in well-known fashion.

At task 280, the event is processed at slave processor 120 in the second instance of the software application, in well-known fashion.

At task 290, the event is processed at master processor 110 in the first instance of the software application, in well-known fashion.

At task 291, a signal is transmitted from slave processor 120 to master processor 110 to indicate a processing result of the event in the second instance of the software application, in well-known fashion.

At task 292, a signal is transmitted from master processor 110 to slave processor 120 to indicate a processing result of the event in the first instance of the software application, in well known fashion.

Task 293 branches based on whether master processor 110 or slave processor 120 detects a safety-critical condition. If so, execution continues at task 294, otherwise the method of FIG. 2 terminates.

At task 294, an alert is generated to indicate the occurrence of a potential safety-critical fault. A potential safety-critical fault can occur when at least one of the following occurs:
  the signal received at task 250 is not received within a first time threshold of the transmission of the signal received at task 230;
  the signal received at task 270 is not received within a second time threshold of the transmission of the signal at task 260;
  the signal transmitted at task 291 is not received by the master processor within a third time threshold of the receipt of the signal at task 270;
  the signal transmitted at task 292 is not received by the slave processor within a fourth time threshold of the transmission of the signal at task 291; and
  there is an inconsistency between the contents of the signals transmitted at task 291 and task 292.

After task 294, the method of FIG. 2 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
  a first processor for:
    executing a first instance of a software application;
    receiving a first signal that indicates the occurrence of an event;
    processing said event in said first instance of said software application;
    transmitting a second signal that indicates the occurrence of said event;
    receiving a third signal in response to said second signal;
    transmitting a fourth signal after the receipt of said third signal within a second time threshold of the transmission of said second signal, wherein said fourth signal indicates that said event has been processed; and
    generating an alert that indicates a potential safety-critical fault when one or both of the following occur:
      (i) said third signal is not received at said first processor within said second time threshold of the transmission of said second signal;
      (ii) there is an inconsistency between the contents of said third signal and the result of the processing of said event in said first instance of said software application; and
  a second processor for:
    executing a second instance of said software application;
    receiving said second signal from said first processor;
    processing said event in said second instance of said software application;

transmitting to said first processor a third signal that indicates the result of processing said event in said second instance of said software application;

receiving said fourth signal;

generating an alert that indicates a potential safety-critical fault when said second signal is not received at said second processor within a first time threshold of the transmission of said first signal; and generating an alert that indicates a potential safety-critical fault when said fourth signal is not received within a third time threshold of the transmission of said first signal.

2. The apparatus of claim 1 wherein said first processor belongs to a first data-processing system, and wherein said second processor belongs to a second data-processing system, and wherein said first data-processing system and said second data-processing system communicate via a network.

3. The apparatus of claim 1 wherein said first processor and said second processor belong to a data-processing system, and wherein said first processor and said second processor communicate via a bus.

4. The apparatus of claim 1 wherein said event is associated with an onboard system of a locomotive.

5. The apparatus of claim 4 wherein said event is associated with the pressure of a brake system.

6. The apparatus of claim 4 wherein said event is associated with a wheel tachometer.

7. The apparatus of claim 1 wherein said event is associated with an offboard system.

8. The apparatus of claim 7 wherein said event is a bulletin for a locomotive.

* * * * *